J. MAGOUN.
MOLD FOR PRESSING GLASS.
No. 5,303. Patented Sept. 25, 1847.
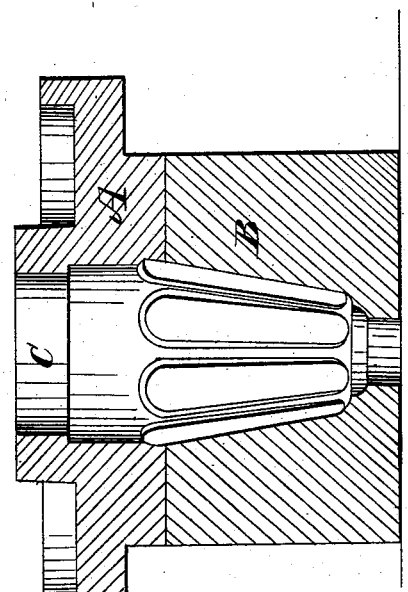

UNITED STATES PATENT OFFICE.

JOS. MAGOUN, OF EAST CAMBRIDGE, MASSACHUSETTS, ASSIGNOR TO NEW ENGLAND GLASS CO.

MOLD FOR PRESSING GLASS.

Specification of Letters Patent No. 5,303, dated September 25, 1847.

*To all whom it may concern:*

Be it known that I, JOSEPH MAGOUN, of East Cambridge, in the county of Middlesex and State of Massachusetts, have invented a new and useful Improvement in Molds for Casting Certain Kinds of Glassware Articles; and I do hereby declare that the same is fully described and represented in the following specification and accompanying drawings, letters, figures, and references thereof.

Of said drawings, Figure 1 represents a top view. Fig. 2 a side elevation, and Fig. 3 a vertical central, and transverse section of my improved mold for casting glass.

The mold therein represented, is intended for the manufacture of an ordinary glass lamp fountain or that part of the lamp which usually contains oil; the said fountain having flutes or flutings on its side in the ordinary manner. That part of the fountain which is above the flutes is generally cast cylindrical, or like a plain cylinder without flutes, or indentations or projections on its exterior surface as seen in Fig. 4, in which the flutes are seen at $a, a, a$, and the part alluded to as above them at $b$, the said figure exhibiting the appearance of the glass, after it is taken from the mold, and before the upper part is heated and contracted in the shape required to receive the metallic collar of the wick tubes. In order to remove the article from the mold, it is necessary that the mold should open apart in two or more pieces. The usual method of making such a mold, has been to make it in two halves, connected together by a hinge, and having a vertical joint between them, where they come together. One half of the mold or matrix would be in one of the parts, while the other half would be in the other part. When a lamp top was cast in such a mold an impression of the vertical seams of the mold would invariably be made along the sides of the glass. By making the mold to open along the edges, or angles of the flutes, the impression could be thrown into the angles or edges of some of the flutes, and not be injurious, so far as it extended on such angle of a flute, to the appearance of the glass. But as the top of the glass or that part of it above the flutes required to be made externally with a plain cylindric surface, the impression of the seams of the mold would be produced and seen on this surface, greatly to the injury of its appearance.

In order to avoid the above mentioned difficulty I make the mold in two or more parts, but with the upper part of it, or all that part of it above the flutes, like a cylindrical ring A without any vertical seam. This ring I make to rest on the top of that part B, of the mold which constitutes the matrix of the fluted part of the glass article, the seam or joint of the two parts A and B, being made to correspond with the curve of the top of the flutes. The piston or plunger of the mold passes down through the circular mouth or opening C. From the above it will be seen that the interior of the ring A, is a hollow cylinder without any vertical joint or opening which can produce any impression or injurious mold mark, on the outer surface of the cylindrical part $b$ of the fountain of the lamp, or whatever glass article of the kind may be cast.

It is often necessary, particularly when a foot or base is to be cast onto the body of any glass, at the time the article is made in the mold, to make the body of the mold, and the foot and shank part to open in two parts, meeting together in vertical seams or joints. The parts B of the mold might be so constructed, the joints or seams being arranged so as to make the impressions or mold marks, come into angles or edges of one or more of the flutes.

The top part of the mold or that which forms the part ($a$) or that above the flutes may be made a solid ring without any vertical seam or opening, and in the case of flat dishes or various other articles, the interior surface of this ring may not be made cylindrical but may be of such shape as circumstances may require. On lifting the ring A from the article and part B, after the former is cast the said article may be readily removed from the mold.

What I claim in the above is—

The ring (A) as combined with and applied to the body or fluted part of the mold in manner and for the purpose as above specified.

In testimony whereof, I have hereto set my signature this thirteenth day of March, A. D. 1847.

JOSEPH MAGOUN.

Witnesses:
R. H. EDDY,
JOSEPH N. HOWE.